Oct. 21, 1969   W. ANGST   3,473,398

INFINITELY VARIABLE FRICTION DRIVE

Filed Oct. 24, 1967

INVENTOR
WALTER ANGST
By Jacobi & Davidson
Attorneys

United States Patent Office 3,473,398
Patented Oct. 21, 1969

3,473,398
INFINITELY VARIABLE FRICTION DRIVE
Walter Angst, Kloten, Switzerland, assignor to Meteor AG, Glattbrugg, Switzerland, a corporation of Switzerland
Filed Oct. 24, 1967, Ser. No. 677,623
Claims priority, application Switzerland, Oct. 26, 1966, 15,530/66
Int. Cl. F16h *15/36*
U.S. Cl. 74—200        8 Claims

ABSTRACT OF THE DISCLOSURE

An infinitely variable friction drive comprising a driving friction wheel and a driven friction wheel. An adjustable friction disk having a running surface in frictional contact with both of the aforesaid friction wheels serves for the regulation of the running diameter of both of said friction wheels. The axis of the friction disk is disposed in a plane containing the respective axis of both said friction wheels, and the friction disk is mounted to be pivotable about an axis which is substantially perpendicular to such plane. Further, each of the friction wheels is provided with a respective running surface having a substantially concave arc-shaped profile and the radius of each such profile corresponds to the spacing between the pivot axis of the friction disk and the running surface thereof.

BACKGROUND OF THE INVENTION

The present invention relates to an improved infinitely variable friction drive.

With the expansion of the field of application of infinitely variable drives, especially in the area of regulation and control technology, the demands which have been placed on such drives with regard to simplicity, reliability and longevity, as well as small dimensions or size with a given efficiency and range of adjustment, are ever increasing. As a general rule, the last mentioned requirement entails the greatest difficulties. Moreover, the known drives leave a great deal to be desired with respect to the accessibility of the parts which have been subjected to wear as well as for the reconstruction and repair of these drives.

SUMMARY OF THE INVENTION

Accordingly, it is a primary object of the present invention to provide an improved friction drive which effectively overcomes the previously mentioned drawbacks.

Another, more specific object of this invention relates to an improved infinitely variable drive which is relatively simple in construction, economical to manufacture, highly reliable in operation, and extremely easy to service.

Still a further important object of the present invention relates to an improved infinitely variable friction drive which affords a wide range of adjustment, is easily regulated to the desired operating speed, and is constructed in such a manner that repair and reconstruction of the drive unit, particularly replacement of those parts which are normally subjected to the most wear, can be carried out in a very simple and efficient manner without having to dismantle a great many components.

Yet a further noteworthy object of the present invention relates to an improved infinitely variable friction drive wherein the components are constructed and arranged in such a manner that servicing of the unit can be carried out with minimum effort.

Now, in order to implement these and still further objects of the invention, which will become more readily apparent as the description proceeds, it should be understood that the inventive friction drive embodies a driving friction wheel and a driven friction wheel as well as an adjustable friction disk which is in frictional contact with both of the aforesaid friction wheels for adjusting the running diameter at both said friction wheels. The axis of the friction disk is disposed in a plane containing the axes of both of said friction wheels. According to an important aspect of the invention, the friction disk is mounted to be pivotable about an axis which extends perpendicular to the aforementioned plane and the friction wheels each possess a respective running surface having a substantially concave arc-shaped curved profile, wherein the radius of the profile corresponds to the spacing between the pivot axis and the running surface of the friction disk.

BRIEF DESCRIPTION OF THE DRAWINGS

The invention will be better understood, and objects other than those set forth above will become apparent, when consideration is given to the following detailed description thereof. Such description makes reference to the annexed drawing wherein.

DESCRIPTION OF THE PREFERRED EMBODIMENT

Figure 1:
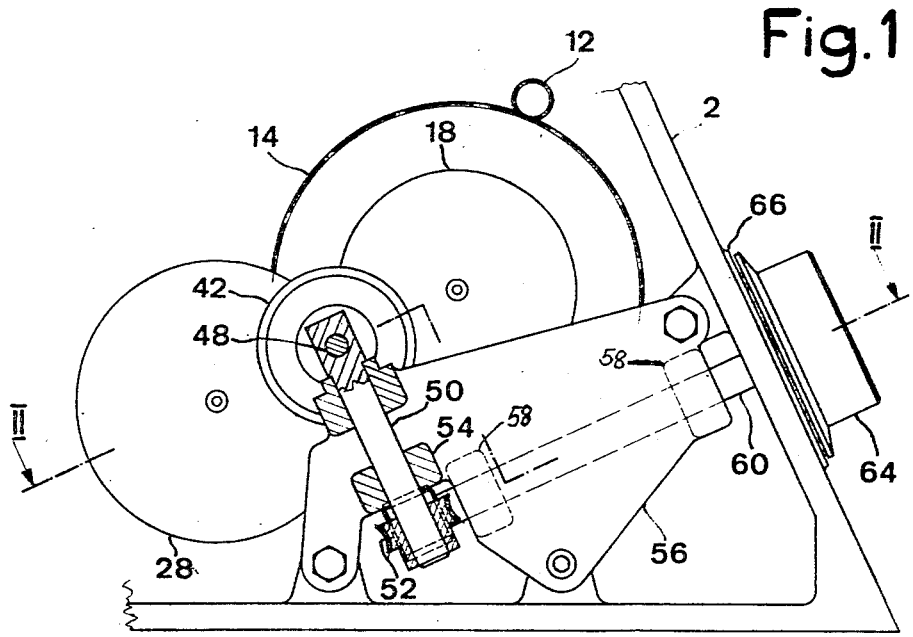
FIGURE 1 is an elevational view, partly in section, of a preferred embodiment of inventive drive.

Referring now to FIGURE 1, it will be seen that reference numeral 2 designates a housing in which there is supported a spindle bearing 4 of a winding spindle 6 by means of its one end, namely its rear end. The other forward end of this spindle bearing 4 is supported in the non-illustrated housing of the wire winding machine. Continuing, it will be recognized that the winding spindle 6 carries at its end which protrudes past the spindle bearing 4 a belt pulley 10 as well as a drive pinion 12, with the belt pulley 10 being entrained by a suitable belt member 8. While the belt member 8 is passed over a non-illustrated further belt pulley which is located at a motor shaft, the pinion 12 meshes with a gear 14 which is seated at a drive shaft 16 mounted at the housing 2. In this arrangement, the gear 14 is rigidly connected for rotation with a friction wheel 18, and further, is arranged to be axially displaceable together with this friction wheel 18 upon the shaft 16, in a manner which will be fully considered hereinafter.

Figure 2:
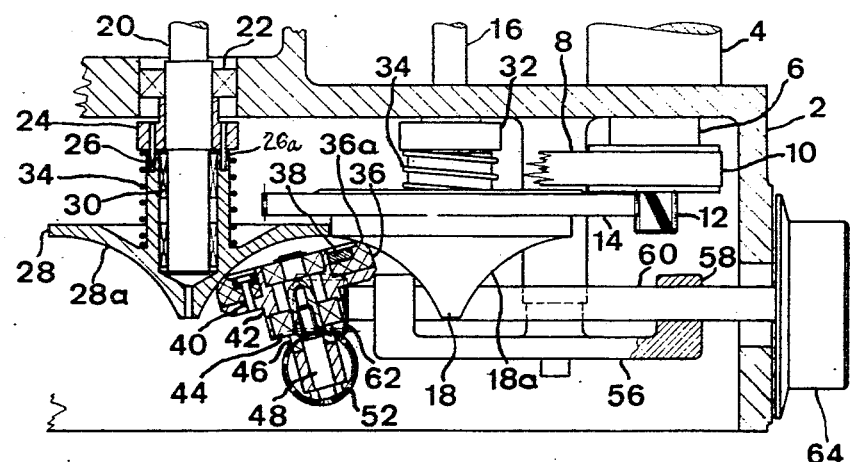
FIGURE 2 is a cross-sectional view of the friction drive depicted in FIGURE 1, and taken along the line II—II thereof, with the friction disk being shown pivoted out of its central position.

As best recognized by inspecting FIGURE 2, a shaft 20 which is likewise mounted in the housing 2 extends parallel to the shaft member 16. Reference numeral 22 represents one of both ball bearings which serve to support this shaft member 20 in the housing 2. An entrainment ring 24 is rigidly secured for rotation upon the shaft member 20 and carries entrainment pins 26 which engage in appropriate bores 26a of a friction wheel 28. This friction wheel 28, in turn, is mounted to be axially displaceable upon the shaft member 20 and specifically, preferably by means of bearing sleeves or bushings 30. The arrangement of the friction wheel 18 at the shaft 16 corresponds to that of the friction wheel 28 at the shaft 20. Further, it will be seen that between the friction wheel 18 and an entrainment ring 32 which is rigidly connected for rotation at the associated shaft member 16 as well as also between the friction wheel 28 and its associated entrainment ring 24 there is arranged a respective pressure spring member 34.

Now, it should be understood that both of these pressure spring members 34 strive to hold the friction wheels 18 and 28 in contact with a friction disk 36 which is secured by means of a clamping ring 38 and a number of clamping screws 40 or the like at a hub or nave member 42. This hub or nave member 42 in turn, is rotatably mounted via ball bearing 44 upon an axle journal or shaft 46. In so doing, this axle journal 46 is secured by means of a bolt member 48 or the like to one end of a pivot shaft 50. The other end of pivot shaft 50 carries a worm gear 52 and is supported in appropriate flanges 54 of a bearing or support plate 56. The latter, which is secured in the housing 2, carries an adjustment shaft member 60 at two further flanges 58. At the inner end of this adjustment shaft member 60 there is secured a worm 62 which meshes with the worm gear 52. Furthermore, the other end of the adjustment shaft member 60 which protrudes out of the housing 2, as shown, carries an adjustment knob 64 with which there is operatively associated a scale 66 carried at the housing 2.

As will be recognized by inspecting FIGURE 1, the pivot shaft member 50 extends substantially perpendicular to an imaginary plane containing the axes of both shaft members 16 and 20 and the axis of the journal 46 can be pivoted in this imaginary plane by suitably rotating the adjustment shaft member 60. Continuing, it will be seen that a substantially spherical contact or running surface 36a is provided at the friction disk 36, the radius of curvature of which is equal to or smaller than the spacing of this running surface 36a from the axis of the pivot shaft member 50, measured in the aforementioned imaginary plane. Accordingly, this radius corresponds to that radius or arc which is described by the friction disk 36 during rotation or pivoting of the pivot shaft member 50. The running or contact surfaces 18a and 28a of the friction wheels 18 and 28 respectively, on the other hand, are defined by a substantially circular- or arc-shaped curved generatrix, the radius of curvature of which is identical with the circular arc described by the friction disk 36.

Since the friction wheels 18 and 28 can be displaced without any binding or clamping upon their shaft members 16 and 20 respectively, it is possible to obtain a uniform contact pressure at the friction wheel 36 by means of the spring members 34, and specifically, independently of possible smaller manufacturing accuracies. Due to the use of a suitable heat-resistant plastic for the friction disk 36 there can be obtained a very great longevity, even with considerable rotational moments.

Since the transmission ratio varies as a function of the angle of rotation of the pivot shaft member 50, with the illustrated arrangement the possibility exists of more exactly regulating the driven or power take-off rotational speed in a lower rotational speed range with a comparatively larger path than in an upper rotational speed range. The control or regulating characteristic fulfills the requirements for utilization of the described drive for winding machines for the change of the feed of the wire guide mechanism. This feed must correspond exactly to the diameter of the wire, so that a higher degree of filling can be obtained at the electric spool which is to be wound. It is apparent, that in so doing, differences between feed velocity and wire diameter with smaller diameters, especially at high winding speeds, are of greater significance than with larger diameters.

Further, as will be recognized from the drawing, the inventive friction drive can be accommodated in a relatively narrow, elongated housing which can be closed by a suitable cover member at the side facing the observer. This form of housing provides a space-saving arrangement for installation at a machine, and the relatively small housing width is attributable to the fact that the friction wheels which are arranged upon substantially parallel shafts have their running or contact surfaces directed to the same side. This arrangement is also responsible for the fact that after removing the cover member, all of the drive components are readily accessable and can be easily dismantled, particularly the friction disk and the friction wheels. Consequently, the inventive drive can be easily checked to determine its operating condition and, as the case may be, the friction disk which is subjected to the most wear can be, if necessary, quickly replaced.

What is claimed is:

1. An infinitely variable friction drive comprising, in combination, a driving friction wheel and a driven friction wheel disposed adjacent to one another in side by side relationship, the running surfaces of both of said friction wheels being directed to the same side, transversely spaced apart axial shaft means which extend in substantial parallelism to one another and upon each of which one of said friction wheels is mounted, an adjustable friction disk having a running surface in frictional contact with the running surfaces of both said driving and driven friction wheels for regulating the running diameter at both of said friction wheels, the axis of said friction disk being disposed in a plane containing the respective axis of both said driving and driven friction wheels, means for mounting said friction disk to be pivotable about an axis which is substantially perpendicular to said plane, each of said friction wheels being provided with a respective running surface having a substantially concave arc-shaped profile, the radius of each profile corresponding to the spacing between said pivot axis of said friction disk and the running surface thereof.

2. An infinitely variable friction drive as defined in claim 1, further including rotatably mounted hub means, said friction disk being formed by a ring formed of plastic which is detachably secured to said hub means.

3. An infinitely variable friction drive as defined in claim 1, wherein said mounting means for said friction disk includes a pivot shaft means to which said friction disk is operatively secured, an adjustment shaft means, and worm and gear means operatively connecting said pivot shaft means with said adjustment shaft means.

4. An infinitely variable friction drive as defined in claim 1, further including a winding spindle means for a wire winding machine, said driving friction wheel being provided with a driving shaft operatively communicating with said winding spindle means, said driven friction wheel being provided with a driven shaft adapted to be connected with the wire guide-feed mechanism of the winding machine.

5. An infinitely variable friction drive comprising, in combination, a driving friction wheel and a driven fricton wheel, an adjustable friction disk having a running surface in frictional contact with both said driving and driven friction wheels for regulating the running diameter at both of said friction wheels, the axis of said friction disk being disposed in a plane containing the respective axis of both said driving and driven friction wheels, means for mounting said friction disk to be pivotable about an axis which is substantially perpendicular to said plane, each of said friction wheels being provided with a respective running surface having a substantially concave arc-shaped profile, the radius of each profile corresponding to the spacing between said pivot axis of said friction disk and the running surface thereof, further including respective shaft means which extend in substantial parallelism to another and upon each of which one of said friction wheels is mounted, said infinitely variable friction drive further including means for mounting at least one of said friction wheels to be axially displaceable upon its associated shaft means.

6. An infinitely variable friction drive as defined in claim 5, wherein bearing sleeve means are provided between said axially displaceable friction wheel and said associated shaft means.

7. An infinitely variable friction drive as defined in claim 5, further including pressure spring means for biasing said axially displaceable friction wheel in the direction of said friction disk.

8. An infinitely variable friction drive as defined in claim 2, further including entrainment means for operably rotatably connecting said axially displaceable friction wheel with said associated shaft means.

References Cited

UNITED STATES PATENTS

| | | | |
|---|---|---|---|
| 1,061,554 | 5/1913 | Naumann | 74—201 |
| 3,066,544 | 12/1962 | Louis | 74—200 |
| 3,240,078 | 3/1966 | Newell | 74—200 |
| 3,261,219 | 7/1966 | Kraus | 74—200 |
| 3,302,474 | 2/1967 | Edlich | 74—200 |

FRED C. MATTERN, Jr., Primary Examiner

J. A. WONG, Assistant Examiner